United States Patent [19]
Gulstad et al.

[11] 3,767,421
[45] Oct. 23, 1973

[54] SHELF STABLE, INTERMEDIATE MOISTURE DOUGHS

[75] Inventors: Clayton O. Gulstad, Coon Rapids; Timothy C. Heitke, Hamel; William M. Dreier, Jr., Minneapolis, all of Minn.

[73] Assignee: General Mills, Inc., Minneapolis, Minn.

[22] Filed: Jan. 19, 1971

[21] Appl. No.: 107,832

[52] U.S. Cl................................ 426/153, 426/62
[51] Int. Cl........................................... A21d 15/00
[58] Field of Search...................... 99/86, 90 R, 92, 99/90 P, 150 R

[56] References Cited
UNITED STATES PATENTS
2,549,595  4/1951  Gregor............................... 99/90 R
2,919,986  1/1960  Johnson............................. 99/92 X
3,294,547  12/1966  Kooistra................................. 99/92

Primary Examiner—Raymond N. Jones
Assistant Examiner—James Robert Hoffman
Attorney—Anthony A. Juettner, Gene O. Enockson and Elizabeth Tweedy

[57] ABSTRACT

Dough compositions having an intermediate moisture level of about 18 to 28 percent by weight of the composition and prolonged shelf life. Part of the amylaceous component in these doughs is gelatinized and part is ungelatinized.

21 Claims, No Drawings

SHELF STABLE, INTERMEDIATE MOISTURE DOUGHS

This invention relates to shelf stable, intermediate moisture dough compositions. More particularly, this invention relates to shelf stable, plastic and sponge dough compositions which contain amylaceous material, part of which is gelatinized and part of which is ungelatinized, and have a moisture content of from about 18 to 28 percent by weight of the dough composition.

Heretofore stabilizing intermediate moisture dough compositions has required the incorporation of high concentrations of sugar, salt or glycerine to inhibit bacterial growth. When sugar or salt are used at concentrations sufficient to inhibit bacterial growth, only very salty or very sweet products can be made which are not very suitable for general use. The use of glycerine at significant levels involves many flavor problems.

The dough compositions of this invention are pliable, elastic, bland, intermediate moisture level doughs of the plastic and sponge types which are shelf stable for months under non-refrigerated storage conditions. Plastic doughs are pliable, elastic doughs which do not depend on the incorporation of gases to develop texture. Included among plastic doughs are tortilla doughs, lefsa doughs and potato cake doughs. Sponge doughs are elastic, pliable doughs which do depend on the incorporation of gases to develop a porous texture. Included among sponge doughs are pizza, bread, roll, biscuit and doughnut doughs.

The dough compositions of this invention include shortening, an amylaceous component selected from starch, cereal flour and mixtures thereof, a portion of the starch in the amylaceous component being gelatinized and a portion being ungelatinized, and about 18 to 28 percent and preferably about 20 to 25 percent overall moisture by weight of the dough composition. Also included is a dough texturizer which can be a dough tenderizer to produce plastic doughs or a leavening agent to produce sponge doughs. Finally the dough compositions include a mold and yeast inhibitor. In making the dough compositions of this invention the ingredients are combined into an elastic dough and, if necessary, dried to a moisture content of from about 18 to 28 percent by weight of the dough compositions. When used by the consumer, the dough is merely cooked, i.e., griddle fried, deep fat fried or baked in a conventional manner, to produce pre-selected conventional products.

In the following detailed description of the invention "by weight on a moisture free basis" means that the moisture normally associated with the various ingredients has been included in the overall moisture calculation and the percentages of ingredients refer to the non-moisture portion of each ingredient. "By weight on an 'as is' basis" means that moisture normally associated with the various ingredients is included in the recited percentage by weight.

Normally the amylaceous component comprises from about 30 to 75 percent by weight on a moisture free basis of the total dough composition. From about 20 to 80 percent by weight on a moisture free basis of the amylaceous component is in the form of gelatinized starch, the remainder of the starch being in an ungelatinized form. Preferably the amylaceous component contains from about 25 to 50 percent gelatinized starch by weight on a moisture free basis. The gelatinized starch can be a cereal starch such as wheat, maize or rice starch, a root starch such as sago or arrowroot or a tuber starch such as potato or tapioca starch. The amylaceous component can be made by mixing raw cereal flour with gelatinized starch, mixing raw starch with gelatinized starch, gelatinizing the starch in a cereal flour so that part of the cereal flour starch is in a gelatinized form and part is not, or by mixing gelatinized and raw flours. Partial gelatinization can be attained through controlled cooking of the cereal flour in a moist atmosphere. The degree of gelatinization in partially cooked flours can be determined by measuring the amount of cell rupture caused by the cooking process. The constituents of the amylaceous component can be selected to produce the traditional characteristics of whatever baked product is to be made. For example, corn flour mixed with a gelatinized starch or corn flour in which part of the starch has been gelatinized can be used for the preparation of tortilla dough. For another example, wheat flour mixed with a gelatinized starch or wheat flour in which part of the starch has been gelatinized can be used for making pizza doughs. Alternatively, a mixture of ungelatinized starch and gelatinized starch can be used and artificial flavoring incorporated into the product to produce the appropriate taste background.

Shortening is normally included in the dough compositions in amounts of from about 0.5 to 20 percent by weight on a moisture free basis of the dough composition and preferably in amounts of from about 0.5 to 15 percent by weight on a moisture free basis of the dough composition. When the shortening level approaches about 20 percent by weight on a moisture free basis of the dough composition, precautions in mixing should be taken to avoid coating the gelatinized starch with the shortening. The shortening can be either of animal or vegetable origin and solid, plastic or liquid. Commonly used fats and oils are: animal fats such as lard, tallow; hydrogenated animal oils; solid vegetable oils such as hydrogenated vegetable shortenings; and liquid vegetable oils such as corn oil, peanut oil, coconut oil and safflower oil.

In order to increase the pliability and workability of some dough compositions included in the scope of this invention, a dough plasticizer can be incorporated into the dough in amounts up to about 10 percent by weight on a moisture free basis of the dough composition. In general, dough plasticizers are used to the best advantage in plastic doughs, preferably in amounts of from 1 to 7 percent by weight on a moisture free basis of the dough composition. Good results were obtained when dough plasticizers were used in sponge doughs in amounts of from 1 to 5 percent. The incorporation of dough plasticizers, however, is not an essential part of the present invention. Suitable plasticizers include propylene glycol, sorbitol, dextrose, levulose, maltose and corn syrup solids. Some of the plasticizers have a dual function. For example, propylene glycol acts as a plasticizer and as a mold and yeast inhibitor when in combination with potassium sorbate. Sorbitol and dextrose act as both plasticizers and water binders. Good results were obtained using about 2.5 to 3.5 percent propylene glycol by weight on a moisture free basis of the dough composition, about 2.0 to 4.0 percent sorbitol by weight on a moisture free basis of the dough composition or about 2.0 to 4.0 percent dextrose by weight on a moisture free basis of the dough composition.

A dough texturizer or combination of texturizers is included in the dough compositions in amounts of from about 0.3 to 10.0 percent by weight on a moisture free basis of the dough composition and is selected from starch tenderizing agents in amounts of from about 0.3 to 1.0 percent by weight on a moisture free basis of the dough composition and leavening agents in the amount of from about 1 to 10 percent by weight on a moisture free basis of the dough composition. Obviously the appropriate dough tenderizer in any particular instance is determined by the particular product desired. If a plastic dough is desired, a dough tenderizer is used. If a sponge dough is desired, a leavening agent is used.

Suitable dough tenderizers include monoglycerides of higher fatty acids having 16 to 18 carbon atom chains, diglycerides of higher fatty acids having 16 or 18 carbon atom chains, blends of mono- and diglycerides with polyoxyethylene sorbitan monostearate, sodium stearyl fumarate, sodium stearayl-2-lactylate and mixtures thereof. Normally dough tenderizers can be used in amounts of from about 0.3 to 1.0 percent and preferably from about 0.3 to 0.7 percent by weight on a moisture free basis of the dough composition.

When the dough texture is developed through a leavening process, the leavening action may take place prior to packaging or be delayed until such time as the dough is cooked by the consumer. When leavening is conducted prior to packaging, leavening agents such as active yeast or a chemical leavening agent can be used. When active yeast is used, the dough is allowed to proof and ferment prior to adjusting the moisture or packaging. Prior to packaging the yeast is inactivated by heating the dough to a temperature of about 160° F. or above. One particular procedure followed in making yeast leavened doughs of this invention is shown in Example III.

Chemical leavening agents can be used to leaven the dough prior to packaging in much the same manner as active yeast is used. Chemical leavening agents are generally composed of an acidifier and a carbonate salt normally sodium bicarbonate. Other carbonate salts such as sodium carbonate, potassium bicarbonate, potassium carbonate and ammonium carbonate are sometimes used. The type of acidifier used generally determines the rate at which carbon dioxide is released from the carbonate salt. For purposes of leavening the dough compositions prior to packaging, the characteristics of the leavening system are not critical. Acidifiers such as monocalcium phosphate monohydrate and tartaric acid which are active at room temperature are preferred. As in the case of yeast, the dough is allowed to rise and the leavening action is finally terminated by a heat treatment which exhausts the reaction.

The preferred manner of leavening the dough is to effect leavening after storage and during the final cooking of the dough prior to actual consumption. Leavening during cooking can be accomplished either by using leavening agents which are only nominally active at room temperature or by protecting the leavening ingredients from the moisture in the dough during storage and releasing them during cooking.

Chemical leavening agents which are only nominally active at room temperature contain carbonate or bicarbonate salt and include acidifiers such as sodium aluminum sulfate, dicalcium phosphate dihydrate and sodium aluminum phosphate. These leavening agents can be incorporated into the dough at room temperature. The dough is then packaged, stored and finally baked. The heat during baking activates the leavening agent and the porous structure of the dough is formed during this operation.

More preferred is the method of leavening in which the leavening ingredients are protected from the moisture in the dough until the baking operation. This method permits selection from a wider range of acidifiers and consequently a wider range of carbon dioxide release rates. The overall value of a leavening agent is largely dependent on the rate at which release occurs and the suitability of the release rate to the product and the mixing-raising-baking cycle. Thus, doughs that are fried require a leavener which acts rapidly upon heating for a brief period on the griddle. On the other hand, a biscuit requires 10 minutes or more to bake and needs a leavener that provides leavening action until the dough has become firm enough to support itself. Good results have been obtained from the dough compositions of the present invention by encapsulating leavening ingredients in high melting temperature fats such as hard butters. Using this technique the leavening ingredients are protected from the moisture in the dough and are unreactive until sufficient heat is applied to melt the fat barrier and permit contact with the moisture. The acidifier and carbonate or bicarbonate salt can be encapsulated together or individually or only the carbonate salt or only the acidifier can be encapsulated. The encapsulation process comprises mixing the leavening ingredient with a melted high melting point fat, cooling and finely dividing the mixture. The cooling and finely dividing process can be carried out by spraying the melted fat containing the leavening ingredients into a cool atmosphere or by cooling the mixture and grinding the resulting solidified mass. Fats melting at temperatures above 110° F. and preferably 120° F. are useful encapsulating materials. The fat may be part of the shortening component if desired. Typical procedures which can be used for encapsulating with fat are set out in Examples V and VI.

As can be readily appreciated, by isolating the chemical leavening ingredients from each other and from the moisture in the dough by means of encapsulation, virtually any chemical leavening ingredients commonly used in the baking industry can be incorporated into the dough compositions of this invention. Hence fast acting leavening ingredients can be used to produce dough products commonly griddle fried or deep fat fried. Slower acting leavening ingredients can be used to produce dough products commonly baked. For example, acidifiers such as sodium acid pyrophosphate are used in making doughnuts and biscuits, acidifiers such as monocalcium phosphate monohydrate, anhydrous coated monocalcium phosphate and sodium aluminum phosphate are used in making muffins and biscuits, acidifiers such as sodium aluminum sulfate, potassium bitartrate and potassium acid tartrate can be used in most products. Other commonly used acidifiers include acetic acid, citric acid, fumaric acid, adipic acid and glucona-delta lactone. It can also be appreciated that encapsulating materials other than high temperature melting fats can be used. Examples of other encapsulating materials include gums, pectins, and proteins.

A mold and yeast inhibitor is incorporated into the dough compositions of this invention. Typical mold and yeast inhibitors which can be used include sodium benzoate, benzoic acid, calcium proprionate, sodium proprionate, sorbic acid, potassium sorbate, calcium sorbate, di-ethyl pyrocarbonate, and salts and esters of monohydroxybenzoic acid. Each inhibitor is incorporated in the particular amount at which it prevents yeast and mold growth. Good results were obtained using potassium sorbate in amounts of from about 0.15 to 0.30 percent by weight on a moisture free basis of the dough composition in combination with propylene glycol in amounts of from about 2.5 to 3.5 perent by weight, moisture free basis, of the dough composition.

The dough compositions of this invention are made by first mixing the ingredients into a mixture having a moisture content of from about 20 to 50 percent by weight of the mixture. When a batter is made up having a moisture level above about 40 percent by weight of the mixture, the batter is dried by low temperature drying to a moisture level of about 40 percent by weight of the mixture at which point most mixtures are workable doughs. If the dough is to be leavened prior to packaging, the dough is allowed to rise and the leavening action finally terminated by a heat treatment. If the dough is to be leavened during ultimate cooking, the rising step is omitted. The dough is then worked until it has developed sufficiently for good shaping. In the case of products such as tortillas and pizza crusts, the dough is generally sheeted to a thickness of from about one-sixteenth of an inch to one fourth of an inch. Dough composition for products such as biscuits, and muffins generally are sheeted to a thickness of about one half to one inch. Dough compositions having moisture levels above about 28 percent by weight are dried to moisture levels between about 18 to 28 percent by weight and preferably to about 20 to 25 percent by weight of the dough composition. Thickly sheeted dough composition containing unencapsulated or exhausted leaveners can be dried at temperatures up to about 140° F. Dough compositions containing encapsulated leaveners are dried at temperatures below the melting point of the encapsulating material. Thinly sheeted dough compositions are preferably dried at temperatures below about 120° F. Once dried the doughs are stable for a period of at least 6 months.

The following examples illustrate the general procedure for making the dough compositions of this invention and more particularly point out some techniques for emphasizing some desirable characteristics in particular products.

EXAMPLE I

PLASTIC DOUGH COMPOSITIONS

This example shows a procedure for making plastic dough compositions of this invention.

A tortilla dough composition was made having the following dough formulation:

| | Percent by Weight on "As is" Basis |
|---|---|
| Gelatinized tortilla flour (50% gelatinized starch by weight) | 61.9 |
| Coconut oil | 5.5 |
| Sorbitol | 3.4 |
| Propylene Glycol | 3.0 |
| Sodium Chloride | 2.0 |
| Calcium Hydroxide | 0.3 |
| Mono- and Diglycerides from the glycerolysis of edible fats and oils, 54-58% alpha mono, 65-69% total mono (Atmul 500, Atlas Chemical Industries) | 0.5 |
| Potassium Sorbate | 0.3 |
| Water | 23.1* |
| Total: | 100.0% |

*Quantity of water added to bring moisture level of mixture to about 30% by weight of the mixture The gelatinized tortilla flour was made by partially cooking whole kernel, lime treated corn before grinding. Whole kernels of corn were soaked in a 0.5 percent by weight lime solution for a period of 16 hours. The kernels were then partially cooked under pressure until about 50 percent of the starch cells had ruptured. The extent of gelatinization was approximated by measuring the extent of starch cell damage. The extent of starch cell damage was determined by measuring the amount of maltose produced when a sample of the flour was digested with an excess of $\alpha$ and $\beta$ amylase. Damaged starch cells are attacked by the amylase while undamaged cells are not.

The tortilla dough was prepared in the following manner.

The propylene glycol, sorbitol salt, potassium sorbate and calcium hydroxide were dissolved in water. The solution was slowly added to the tortilla flour during gentle mixing in a Hobart food mixer. The coconut oil and mono- and diglycerides combined and melted, were added during the mixing. The mixed batter was passed through a Toledo Chopper extruder in order to form a plastic dough. The plasticized dough was sheeted through sheeting rolls to a thickness of roughly 0.070 inch and cut into individual 5 inch diameter tortillas. The processing stages reduce the moisture level of the tortillas from their initial value to about 30 percent by weight to a finished value of about 22 percent by weight.

The dough composition was storage tested under both ambient room temperature conditions and at a relative humidity of 65 percent with temperatures cycled from 70° to 90° F. At the end of a 16 week period the dough compositions showed no significant bacteria, mold, or yeast growth. The products were fried for a period of 1 to 1¼ minute in corn oil at a temperature of 400° F. The flavor, color and texture of the products showed no significant deterioration and the fried products had good eating quality.

EXAMPLE II

USE OF DOUGH TENDERIZERS

This example illustrates the use of a dough tenderizer in making the plastic dough compositions of this invention.

Four dough compositions were made up using the procedure shown in Example I, varying the amount of dough tenderizer used and otherwise using the same ingredient formulation as shown in Example I. The weight variation of the dough conditioner was compensated for by adjusting the amount of flour in the formulation. The variations in the dough tenderizer, namely mono- and diglycerides from the glycerolysis of edible fats and oils, 54–58 percent alpha mono, 65–69 percent total mono, (Atmul 500, Atlas Chemical Industries) are shown below.

| Sample | Dough Tenderizer Percentage by Weight of Dough Composition |
|---|---|
| 1 | 0.0 |
| 2 | 0.3 |
| 3 | 0.6 |
| 4 | 0.9 |

The samples were griddle fried. The process and product evaluation is shown below.

Sample 1. The dough was very easy to plasticize during the Toledo Chopper dough working stage and sheeted excellently. Due to the highly plastic quality of the dough, the finished, fried tortillas were tougher in texture and more rubbery than typical tortillas.

Sample 2. The dough plasticized well during the Toledo Chopper dough working stage and sheeted successfully. The finished fried tortillas were tougher in texture than typical tortillas.

Sample 3. The dough plasticized well during the Toledo Chopper dough working stage and sheeted well. The finished fried tortilla was tender and comparable to typical commercially available tortilla products.

Sample 4. The dough was difficult to plasticize in the Toledo Chopper dough working stage and difficult to sheet because it lacked sufficient elasticity. During frying the tortilla developed a hard, granular type texture.

The above samples show that the texture of the plastic doughs of this invention can be varied from tough and elastic in consistency to fragile and "short" in consistency by varying the amount of dough tenderizer used in the formulation or excluding it entirely.

EXAMPLE III

SPONGE DOUGH COMPOSITION

This example shows a procedure for making a sponge dough composition of this invention using active yeast.

A pizza dough composition was made having the following dough formulation:

| | Percent by Weight on "As is" Basis |
|---|---|
| High Protein Hard Wheat Flour (15% protein by weight) | 34.6 |
| Gelatinized Corn Starch | 23.1 |
| Corn Oil | 5.4 |
| Propylene Glycol | 3.4 |
| Active Dry Yeast | 2.6 |
| Dextrose | 2.0 |
| Non-fat Dried Milk Solids | 1.4 |
| Sodium Chloride | 1.0 |
| Potassium Sorbate | 0.3 |
| Water | 26.2* |
| Total: | 100.0 |

*Quantity of water required to bring the moisture level of th dough composition to about 32% by weight The wheat flour and gelatinized corn starch were dry blended. The dextrose, salt, non-fat dried milk solids and the active dry yeast were dissolved in water at a temperature of 120° F. Potassium sorbate, propylene glycol and corn oil were stirred into the solution. The solution was then mixed into the flour and gelatinized corn starch blend using a Hobart mixer with a hook attachment. Mixing was continued until the batter formed an elastic dough. The dough was then hand worked into a tight ball and proofed for a period of 45 minutes at a temperature of about 80° to 90° F. The proofed dough composition was then worked into multiple tight dough balls, each a size to form one individual pizza crust. The dough composition was then allowed to proof for an additional 45 minutes. The balls of dough composition were then sheeted to a thickness of roughly one eighth inch. To inactivate the yeast the dough composition was heat treated in an oven for a period of 10 minutes at a temperature of 180° F. The heat treatment reduced the moisture content of the dough composition to 22.5 percent by weight.

The dough samples were storage tested in poly foil bags held in an ambient room temperature environment and an environment of 65 percent relative humidity and temperatures cycling between 70° F. and 90° F. The dough compositions substantially retained their porosities for a period of 1 month. No significant bacteria, yeast or mold growth was detected after a period of 24 weeks. After one month of storage, the samples were baked for a period of 16 minutes at a temperature of 425° F. The samples showed no significant deterioration in flavor, color or texture and had good eating quality.

EXAMPLE IV

SPONGE DOUGH COMPOSITIONS

This example illustrates a procedure for making a sponge dough composition of this invention using a chemical leavening system.

A pizza dough composition was made having a dough formulation as follows:

| | Percent By Weight on an "As is" Basis |
|---|---|
| High Protein Hard Wheat Flour (15% protein by weight) | 33.9 |
| Gelatinized Corn Starch | 22.6 |
| Coconut Oil | 5.3 |
| Propylene Glycol | 3.3 |
| Dextrose | 2.0 |
| Non-fat Dried Milk Solids | 1.3 |
| Salt | 1.0 |
| Sodium Aluminum Phosphate | 0.8 |
| Sodium Bicarbonate | 0.7 |
| Inactive Dry Yeast (Red Star) | 0.7 |
| Potassium Sorbate | 0.3 |
| Water | 28.1* |
| Total: | 100.0 |

*Quantity of water required to bring the moisture level of the dough composition to about 34% by weight The dextrose, non-fat dried milk solids, salt, potassium sorbate and incative dry yeast were dissolved in water. The wheat flour, gelatinized corn starch, sodium aluminum phosphate and sodium bicarbonate were dry blended in a Hobart mixer with a hook attachment.

The prepared solution of dextrose, non-fat dried milk solids, salt, potassium sorbate and incative dry yeast was slowly added to the wheat flour-gelatinized corn starch blend. The propylene glycol was then added to the blend. After all the free moisture in the mixture was absorbed by the flour and gelatinized starch, the coconut oil in melted form was added. The dough composition was then hand kneaded until it developed sufficiently elasticity for good sheeting. It was then sheeted in sheeting rolls to a thickness of roughly one eighth inch and cut into shapes for individual pizza crusts. The dough pieces were dried for a period of about 90 minutes at a temperature of about 118° F. to attain a moisture level of 18.8 percent by weight.

The dough pieces were put into storage testing under both ambient room temperature conditions and storage conditions having a relative humidity of 65 percent and a cycled temperature of 70° to 90° F. After 16 weeks in storage, the samples showed no significant bacteria, yeast or mold growth. The samples were baked for a period of 16 minutes at a temperature of 425° F. The samples showed no significant deterioration in flavor, color or texture and had good eating quality.

EXAMPLE V

SPONGE DOUGH COMPOSITION

This example illustrates the preparation and use of encapsulated leaveners in the dough compositions of this invention.

A hydrogenated all-vegetable hard butter (Hydrokote 915, Capital City Products Co.) with a melting point of about 122° to 126° F. was melted and sodium bicarbonate and sodium aluminum phosphate were thoroughly mixed into the fat. The composition by weight of the mixture was about 16.0 percent sodium bicarbonate, about 20.2 percent sodium aluminum phosphate and 63.8 percent fat. The melt mixture was sprayed from a DeVilbiss spray gun into a 0° F. atmosphere. The spray droplets solidified in the air and dropped out into a collector as discrete miniature capsules. These capsules were of a granulation range such that essentially all of them passed through a No. 30 U. S. Standard sieve and were retained on a No. 100 U. S. Standard sieve. The capsules were tested for moisture tolerance by submerging a sample in cold tap water for a period of 30 minutes and then slowly heating the water. No apparent carbon dioxide emission occurred while the product was submerged in the cold tap water. A considerable amount of carbon dioxide was released as the capsules melted during the heating period.

A pizza dough containing the encapsulated leaveners was prepared using the following ingredients:

|  | Percent by Weight of Dough Composition |
|---|---|
| High Protein Hard Wheat Flour (15% protein by weight) | 36.8 |
| Leavening Capsules | 14.0 |
| Gelatinized Corn Starch | 12.3 |
| Propylene Glycol | 2.9 |
| Coconut Oil | 2.5 |
| Dextrose | 1.7 |
| Non-Fat Dried Milk Solids | 1.2 |
| Salt | 0.9 |
| Inactive Dry Yeast (Red Star) | 0.6 |
| Potassium Sorbate | 0.3 |
| Water | 26.8* |
| Total: | 100.0 |

*Quantity of water required to raise the moisture content of the dough composition to about 35% by weight The high protein wheat flour and gelatinized corn starch were dry blended. The dextrose, salt, propylene glycol, potassium sorbate, inactive dry yeast and non-fat dried milk solids were dissolved in water and the solution mixed into the wheat flour-geltainized corn starch blend by means of a Hobart food mixer with a dough hook attachment. Mixing was continued until all the free moisture was absorbed by the flour and starch. The coconut oil in melted form was then mixed into the dough composition. During the final part of the mixing, the leavening capsules were added. The processed dough was divided into pieces of the size to make one individual pizza crust. The pieces were sheeted to a thickness of about one eighth inch in thickness and dried from their initial moisture content of about 35 percent by weight to a moisture content of about 21.5 percent by weight by forced air drying for a period of about 2½ hours at a temperature of about 112° F. in a Laboratory Despatch Oven. The dough was still soft and pliable at the reduced moisture level.

After 12 weeks of storage, the dough rose to roughly twice its initial thickness during baking for 12 minutes at a temperature of 400° F. and developed a good, spongy, firm texture. No significant bacteria, yeast or mold growth was observed in the stored samples. The baked samples showed no significant deterioration in flavor, color or texture and had good eating quality.

EXAMPLE VI
SPONGE DOUGHS

This example illustrates another method of encapsulating the leavening agents.

A hydrogenated all-vegetable hard butter (Hydrokote 915, Capital City Products Co.) with a melting point of about 122° to 126° F. was melted and sodium bicarbonate and sodium aluminum phosphate were thoroughly mixed into the melted fat. The composition by weight of the mixture was about 16.0 percent sodium bicarbonate, about 20.2 percent sodium aluminum phosphate and 63.8 percent fat. The melted mixture was rapidly solidified by dropping large droplets of it into cool water. The droplets were then removed from the water, surface dried with forced room temperature air, mixed with small chunks of dry ice and ground in a Hobart mixer meat grinder attachment. The mixture in its frozen and ground form was screened to obtain a fraction which passed through a No. 10 U. S. Standard sieve and retained on a No. 30 U. S. Standard sieve. A sample of the capsules were moisture tolerance tested as in Example V with the same final result. The leavening capsules were incorporated into a pizza dough as in the same manner as described in Example V. The dough was dried to a moisture content of about 22 percent. After 12 weeks storage, the dough was still soft and pliable and rose to roughly twice its thickness upon baking for 16 minutes at a temperature of 425° F. No significant bacteria, mold or yeast growth was observed. The baked samples showed no significant deterioration in flavor, color or texture and had good eating quality.

EXAMPLE VII
SPONGE DOUGH COMPOSITIONS

This example further illustrates the use of a chemical leavening system for making sponge dough products.

A biscuit dough composition was made having a dough formulation as follows:

|  | Percent by Weight on an "As is" Basis |
|---|---|
| Soft Wheat Flour (9% protein by weight) | 38.67 |
| Pregelatinized Corn Starch | 12.89 |
| Plastic Shorteining (Crisco, Proctor and Gamble Co.) | 5.33 |
| Encapsulated Chemical Leaveners* | 7.22 |
| Non-Fat Dried Milk Solids | 5.33 |
| Propylene Glycol | 2.77 |
| Salt | 1.03 |
| Sucrose | 1.43 |
| Potassium Sorbate | 0.26 |
| Water | 25.09** |
| Total: | 100.00 |

*The encapsulated leavening system was composed of 63.7% hydrogenated all-vegetable hard butter (Hydrokote 915, Capital City Products Co.), 16.0% sodium bicarbonate and 20.3% sodium aluminum phosphate all by weight of the encapsulated leavening system.
**Quantity of water required to raise the moisture content of the dough composition to about 30% by weight The ingredients of the dough composition were mixed by the same procedure as shown in Example V. The dough was then sheeted to a thickness of one half inch and dried from its initial moisture content of about 30 percent by weight to a moisture content of about 26 percent by weight of the dough composition.

Upon baking at a temperature of about 350° F. for a period of about 10 minutes, the dough raised to a thickness of about 1 inch to form a golden brown biscuit with good texture.

We claim:

1. A shelf stable dough composition comprising:
   about 30 to 75 percent amylaceous component by weight on a moisture free basis of the dough composition, said component being selected from starch, cereal flour and mixtures thereof wherein about 20 to 80 percent of said amylaceous component by weight on a moisture free basis is gelatinized starch,
   about 0.5 to 20 percent shortening by weight on a moisture free basis of the dough composition,
   a starch tenderizing agent selected from monoglycerides of higher fatty acids, diglycerides of higher fatty acids, blends of mono- and diglycerides with polyoxyethylene sorbitan monostearate, sodium stearyl fumerate, sodium stearyl-2-lactate and mixtures thereof in an amount of from about 0.3 to 1.0 percent by weight on a moisture free basis of the dough composition,
   a mold and yeast inhibitor, and
   about 18 to 28 percent overall moisture by weight of the total dough composition.

2. The dough composition of claim 1 wherein said amylaceous component contains about 25 to 50 percent by weight on a moisture free basis gelatinized starch, the remainder of the starch being ungelatinized.

3. The dough composition of claim 1 wherein the shortening is in an amount of from about 0.5 to 15 percent by weight on a moisture free basis of the dough composition.

4. The dough composition of claim 1 wherein the moisture content of the dough composition is about 20 to 25 percent by weight of the dough composition.

5. The dough composition of claim 1 which also contains a dough plasticizer in an amount up to about 10 percent by weight on a moisture free basis of the dough composition.

6. The dough composition of claim 1 wherein the amulaceous component is a partially gelatinized cereal flour.

7. A shelf stable dough composition of claim 6 which also contains a dough plasticizer in an amount of from 1 to 7 percent by weight on a moisture free basis of the dough composition.

8. The dough composition of claim 1 wherein the amylaceous component is a mixture of comprises pregelatinized starch ungelatinized starch.

9. The dough composition of claim 1 wherein the amylaceous component comprises pregelatinized starch and ungelatinized cereal flour.

10. A shelf stable, dough composition comprising:
    about 30 to 75 percent amylaceous copmponent by weight of the dough composition, said amylaceous component being selected from starch, cereal flour and mixtures thereof and from about 25 to 50 percent of said amylaceous component by weight on a moisture free basis being gelatinized starch,
    about 0.5 to 15 percent shortening by weight of the dough composition,
    about 0 to 7 percent dough plasticizer by weight of the dough composition,
    a starch tenderizing agent selected from monoglycerides of higher fatty acids, diglycerides of higher fatty acids, blends of mono- and diglycerides with polyoxyethylene sorbitan monostearate, sodium stearyl fumerate, sodium stearyl-2-lactate and mixtures thereof in an amount of from about 0.3 to 0.7 percent by weight of the total dough composition,
    a mold and yeast inhibitor, and
    about 18 to 26 percent overall moisture by weight of the total dough composition.

11. A shelf stable dough composition comprising:
    about 30 to 75 percent amylaceous component by weight on a moisture free basis of the dough composition, said component being selected from starch, cereal flour and mixtures thereof wherein about 20 to 80 percent of said amylaceous component by weight on a moisture free basis is gelatinized starch,
    about 0.5 to 20 percent shortening by weight on a moisture free basis of the dough composition,
    a leavening agent in an amount of from about 1 to 10 percent by weight on a mixture free basis of the dough composition,
    a mold and yeast inhibitor, and
    about 18 to 28 percent overall moisture by weight of the total dough compositon.

12. The dough composition of claim 11 wherein the leavening agent is a chemical leavening agent.

13. The dough composition of claim 12 wherein the chemical leavening agent is encapsulated in high temperature melting fat.

14. A shelf stable dough composition of claim 11 which also contains a dough plasticizer in an amount of from about 1 to 7 percent by weight on a moisture free basis of the dough composition.

15. The dough composition of claim 11 wherein said amylaceous component contains about 25 to 50 percent by weight on a moisture free basis gelatinized starch, the remainder of the starch being ungelatinized.

16. The dough composition of claim 11 wherein the shortening is in an amount of from about 0.5 to 15 percent by weight on a moisture free basis of the dough composition.

17. The dough composition of claim 11 wherein the moisture content of the dough composition is about 20 to 25 percent by weight of the dough composition.

18. The dough composition of claim 11 wherein a dough plasticizer is included in an amount up to about 10 by weight on a moisture free basis of the dough composition.

19. The dough composition of claim 11 wherein the amylaceous component is a partially gelatinized cereal flour.

20. The dough composition of claim 11 wherein the amylaceous component is a mixture of pregelatinized starch and ungelatinized starch.

21. The dough composition of claim 11 wherein the amylaceous component comprises pregelatinized starch and ungelatinized cereal flour.

* * * * *